US012174092B2

(12) United States Patent
Baird, IV et al.

(10) Patent No.: US 12,174,092 B2
(45) Date of Patent: Dec. 24, 2024

(54) SYSTEM AND METHOD FOR MONITORING AND REPORTING LIQUID NITROGEN CONTAINER LEVEL

(71) Applicants: William C. Baird, IV, Wilmington, NC (US); Chad A. Johnson, Milton, GA (US); William C. Baird, III, Dublin, OH (US); Justin Funk, Olmsted Township, OH (US); Nathan Funk, Olmsted Falls, OH (US)

(72) Inventors: William C. Baird, IV, Wilmington, NC (US); Chad A. Johnson, Milton, GA (US); William C. Baird, III, Dublin, OH (US); Justin Funk, Olmsted Township, OH (US); Nathan Funk, Olmsted Falls, OH (US)

( * ) Notice: Subject to any disclaimer, the term of this patent is extended or adjusted under 35 U.S.C. 154(b) by 241 days.

(21) Appl. No.: 17/537,048

(22) Filed: Nov. 29, 2021

(65) Prior Publication Data
US 2022/0196514 A1    Jun. 23, 2022

Related U.S. Application Data

(63) Continuation of application No. 17/001,543, filed on Aug. 24, 2020, now Pat. No. 11,187,611, which is a continuation-in-part of application No. 16/557,846, filed on Aug. 30, 2019, now Pat. No. 10,753,821.

(60) Provisional application No. 62/724,734, filed on Aug. 30, 2018.

(51) Int. Cl.
    *G01M 3/32* (2006.01)
(52) U.S. Cl.
    CPC ................ *G01M 3/3209* (2013.01)

(58) Field of Classification Search
    CPC .................. G01M 3/3209; G01M 3/3245
    See application file for complete search history.

(56) References Cited

U.S. PATENT DOCUMENTS

| 3,520,186 | A | 7/1970 | Adams et al. |
| 4,034,361 | A | 7/1977 | Mortensen |
| 4,691,793 | A | 9/1987 | Kumakura et al. |
| 5,842,347 | A | 12/1998 | Kinder |
| 6,258,320 | B1* | 7/2001 | Persing ................ A01N 1/00 422/527 |
| 11,092,509 | B1 | 8/2021 | Langley et al. |
| 2002/0101373 | A1 | 8/2002 | Arndt et al. |
| 2007/0050271 | A1* | 3/2007 | Ufford ............. G06Q 10/087 705/28 |
| 2007/0261894 | A1* | 11/2007 | Harish ............ G01G 23/3735 177/211 |

(Continued)

OTHER PUBLICATIONS

Networked Robotics Corporation, Monitoring Liquid Nitrogen Storage Dewars by Weight, article, Jun. 2020, 4 pages.

*Primary Examiner* — James J Yang
(74) *Attorney, Agent, or Firm* — Standley Law Group LLP; Adam J. Smith

(57) ABSTRACT

Exemplary embodiments disclosed herein are directed to systems and methods by which the contents of a container, such as the level of liquid nitrogen in one or more liquid nitrogen storage containers, can be locally and/or remotely monitored, and alerts can be generated if a leak is detected. The weight of the container, or a combination of the weight and the temperature of the container, may be monitored with respect to detecting a leak.

22 Claims, 4 Drawing Sheets

(56) References Cited

U.S. PATENT DOCUMENTS

2014/0333444 A1 11/2014 Grant et al.
2016/0264394 A1* 9/2016 Hershberger ........ B67D 1/0888

* cited by examiner

| WRL LN2 tank testing | Date | Time | Weight | CM of LN2 | Alarm Temp | Comments |
|---|---|---|---|---|---|---|
| | 4/24/2018 | 2:30P | 99.55 | 36.0 | -195 | W/out neck tube |
| | | 3:30P | 98.80 | 35.0 | | |
| | | 4:30P | 98.25 | 34.0 | | |
| | 4/25/2018 | 10:00A | 91.70 | 30.0 | -196 | |
| | | 10:20A | 100.00 | 36.5 | -196 | Refilled to 100lbs, nothing in neck and cap open |
| | | 2:30P | 98.50 | 35.0 | -196 | |
| | 4/26/2018 | 9:30A | 90.50 | 33.0 | -196 | |
| | | 1:45P | 88.00 | 28.0 | -196 | |
| | 4/29/2018 | 6:30A | 41.65 | 1.0 | -177 | Alarming |

FIG. 4

SYSTEM AND METHOD FOR MONITORING AND REPORTING LIQUID NITROGEN CONTAINER LEVEL

CROSS-REFERENCE TO RELATED APPLICATIONS

This application is a continuation of U.S. patent application Ser. No. 17/001,543 filed on Aug. 24, 2020, which is a continuation-in-part of U.S. patent application Ser. No. 16/557,846 filed on Aug. 30, 2019, now U.S. Pat. No. 10,753,821, which claims the benefit of U.S. Provisional Application No. 62/724,734 filed on Aug. 30, 2018. All of said applications are hereby incorporated by reference as if fully recited herein.

TECHNICAL FIELD

Exemplary embodiments disclosed herein are directed to systems and methods by which the level of liquid nitrogen in one or more storage containers can be monitored and at least problem situations such as leaks may be reported.

BACKGROUND

With the advent of In Vitro Fertilization (IVF), human gametes (sperm, eggs, embryos) are surgically and non-surgically obtained from infertility patients and cancer patients, as well as patients wanting to store their gametes for future use. These gametes are stored in liquid nitrogen and or liquid nitrogen vapor. The expense, both financially and emotionally, of acquiring, storing and later using these gametes for procreation can run very high. Thus, protecting these frozen "assets" is one of the most important roles of the infertility laboratory.

Gametes are stored in liquid nitrogen tanks of various sizes, shapes and constructions. Most importantly, these tanks must include an intact vacuum sealed chamber to prevent rapid loss of liquid nitrogen, and therefore, temperature. Liquid nitrogen exists at −196° C. (~−400° F.) and while storage in the vapor phase can vary, it needs to be below −150° C. to ensure the integrity of the cryopreserved specimens.

Historically, the monitoring of a liquid nitrogen tank has been considered to require a multi-disciplined approach that typically includes: the daily visual inspection of all tanks, with careful examination of the exterior of the tank for sweating, frost, and/or liquid nitrogen vapors; the use of a dipstick to measure actual liquid nitrogen levels at least twice per week; and electronic monitoring by an electronic alarm system.

Daily visual inspection of and/or the actual measurement of liquid nitrogen levels within a liquid nitrogen tank may be sufficient to discover a slow leak. However, in the event of a more catastrophic and rapid loss of liquid nitrogen from a liquid nitrogen tank, electronic monitoring is typically relied on to detect the problem. Currently, electronic monitoring of liquid nitrogen levels within a liquid nitrogen tank (regardless of size, design or construction) is performed almost exclusively by thermocouple probes that are placed into the opening of the tank. Such a thermocouple probe can be placed in direct contact with the liquid nitrogen in the tank, or may be located above the liquid nitrogen in the superjacent vapor phase. In any case, the thermocouple probe is typically connected to a monitoring system that monitors the temperature within the tank and triggers an alarm if the internal tank temperature exceeds some predetermined value.

A significant shortcoming with respect to the temperature-based monitoring of liquid nitrogen tank internal temperature results from the possibility of detecting an acceptably low temperature even though the tank may already be devoid or substantially devoid of liquid nitrogen due to a leak. More specifically, because liquid nitrogen is so cold and frequently exists at least partially as a vapor within a typical liquid nitrogen tank, the liquid nitrogen vapor may cause the internal temperature of a liquid nitrogen tank to remain at an acceptable level and not trigger an alarm for some period of time after all of the liquid nitrogen has actually leaked out of the tank.

In the case of a significant liquid nitrogen tank failure such as, for example, a tank vacuum system breach (e.g., through external damage to the tank causing a seam to split or a weld to break), rapid liquid nitrogen loss can occur in a matter of minutes, or at most, a few hours. If such a rapid loss of liquid nitrogen were to occur under the circumstances described above, where remaining liquid nitrogen vapor maintains an acceptable tank temperature for some short period of time after a major or complete liquid nitrogen loss, it should be understood that the internal tank temperature will eventually begin to rise rapidly and the integrity of the specimens within the tank will be compromised in short order—quite possibly well before a temperature-based alarm system can issue an alarm and the tank and specimens can be tended to. As most liquid nitrogen storage tanks can hold hundreds if not thousands of specimens, a complete loss of even one tank can be catastrophic for patients and the infertility practice alike.

Unfortunately, real-world examples of such a scenario occurred in March of 2018, when two separate IVF clinics experienced catastrophic specimen loss due to liquid nitrogen tank leaks that were not detected quickly enough. In the case of one of the clinics alone, hundreds if not thousands of specimens completely thawed and were, therefore, a total loss. The resulting emotional toll on patients is impossible to determine, and the financial loss to will certainly run into the millions. And this is not the first time that liquid nitrogen tank failures have occurred in the IVF setting.

In addition to the aforementioned problems associated with detecting and issuing an alert regarding a significant liquid nitrogen tank failure, other shortcomings associated with the use of liquid nitrogen tanks that await remedy include ensuring proper tank fill level (i.e., preventing underfill or overfill) and monitoring and determining tank health over an extended time period.

Achieving proper fill level has long been a problem associated with the use of liquid nitrogen tanks. As should be apparent to most, underfilling can obviously result in inadequate preservation of specimens stored in the tank. However, overfilling is also a problem, and the loss of overflowed liquid nitrogen leads to unnecessary expenses not only due to the cost of the liquid nitrogen itself, but also due to repair costs to flooring and/or other surfaces that are damaged by the extremely low temperature of the overflowed liquid nitrogen. It is also desirable to avoid contact with liquid nitrogen, even when wearing proper protective equipment.

In addition to concerns about detecting and correcting significant liquid nitrogen tank failures, users of liquid nitrogen tanks are also concerned with long-term tank health. The performance of liquid nitrogen tanks typically degrades over time, with the degradation in performance typically manifesting as an inability to maintain the previous vacuum capacity. In comparison to a significant tank failure, long-term tank degradation is much more subtle and, therefore, more difficult to detect. Yet, it is highly desirable to detect such degradation so that the affected tank can be further monitored and perhaps replaced before the problem becomes more severe.

Exemplary system and method embodiments disclosed herein are usable to solve the aforementioned problems with liquid nitrogen tank use.

SUMMARY

Exemplary system and method embodiments disclosed herein are designed to overcome the above-described problems inherent to known liquid nitrogen monitoring systems and methods. Primarily, exemplary system and method embodiments are designed to monitor liquid nitrogen containers (e.g., tanks) based on container weight rather than container temperature. Liquid nitrogen, because of its extremely low temperature, boils at normal room temperature. As a result, vacuum sealed containers are necessary. This same attribute, however, makes the use of weight as a measurement of container integrity a more useful tool than temperature measurement.

An exemplary embodiment of a liquid nitrogen container monitoring system and method of use generally would include a weight sensor, which may be a single or multiple load cell weighing device such as a scale or another appropriate weighing mechanism upon which a liquid nitrogen container of interest is placed or from which a liquid nitrogen container of interest is suspended. The weight sensor is preferably sufficiently sensitive to detect subtle changes in the weight of the liquid nitrogen container associated therewith.

An exemplary embodiment of a liquid nitrogen container monitoring system and method of use may also include a temperature sensor to monitor the temperature of liquid nitrogen in a liquid nitrogen container of interest. When present, the temperature sensor is used in conjunction with the container weighing device to monitor the amount of liquid nitrogen in the container.

An exemplary embodiment of a liquid nitrogen container monitoring system and method of use may further include an ultrasonic level detector to monitor the level of liquid nitrogen in a liquid nitrogen container of interest. When present, the ultrasonic level detector is used in conjunction with the container weighing device to monitor the amount of liquid nitrogen in the container. A temperature sensor may also be present in embodiments that utilize a weighing device and ultrasonic level detector for added monitoring redundancy.

The scale is coupled to a monitoring device, as is the temperature sensor and/or the ultrasonic level detector when present. The monitoring device includes programming, in the form of software or otherwise, that is configured to receive data from the sensor(s) and to analyze the data to detect changes in the amount of liquid nitrogen present in a container of interest and to determine if a given change in the amount of liquid nitrogen present is within or outside of a normal, expected, change value range. A change outside of an expected, change value range may indicate a container leak, which may be deemed a significant/catastrophic leak or a slower degradation-type leak based on the selected change value range and the rate of observed weight change. A change outside of an expected change value range may cause the monitoring device to transmit an alarm, to indicate a possible degradation problem, and/or to perform other functions described in more detail below.

Preferably, the programming of the monitoring device also includes the ability to identify trends and to predict possible failures before they happen. The adaptable nature of the monitoring device allows an exemplary system to be used with a liquid nitrogen container of any type, size or construction, as weight sensor capacity may be scaled according to container size and the monitoring device programming may be configured relative to any liquid nitrogen container and its normal/expected weight loss rate. Likewise, the optional temperature sensor and ultrasonic level detector may be adapted to any liquid nitrogen container of interest.

An exemplary liquid nitrogen container monitoring system and method embodiment may include a weight sensor that is appropriately sized and sensitive to weigh the container with which it will be paired.

An exemplary embodiment of a liquid nitrogen container monitoring system and method of use may include a temperature sensor to provide redundancy by monitoring the temperature of liquid nitrogen in a liquid nitrogen container of interest.

An exemplary embodiment of a liquid nitrogen container monitoring system and method of use may include an ultrasonic level detector to provide further redundancy by monitoring the physical level of liquid nitrogen in a liquid nitrogen container of interest.

An exemplary embodiment of a liquid nitrogen container monitoring system and method may include an intermediate connection-transmission device having a wireless transmitter that transmits weight data and, optionally, container temperature and/or liquid nitrogen level data from the weighing device, temperature sensor and ultrasonic level detector, respectively, to the monitoring device.

An exemplary liquid nitrogen container monitoring system and method embodiment may include predetermined data and algorithms to facilitate use with many if not all known types and brands of liquid nitrogen container.

An exemplary liquid nitrogen container monitoring system and method embodiment may include a monitoring device having the ability to transmit local audible and/or visual alerts in the case of a detected leak.

An exemplary liquid nitrogen container monitoring system and method embodiment may include a monitoring device having the ability to transmit alerts to identified persons by wired or wireless communications in the form of, for example, voice, text, or email messages.

An exemplary liquid nitrogen container monitoring system and method embodiment may be remotely accessible by a user through, for example, a computer, smart phone or other electronic communication mechanism.

An exemplary liquid nitrogen container monitoring system and method embodiment may include a server and/or cloud-based data management system.

An exemplary liquid nitrogen container monitoring system and method embodiment may include continuous or periodic data logging for quality control and compliance purposes.

An exemplary liquid nitrogen container monitoring system and method embodiment may be operative to simultaneously monitor multiple liquid nitrogen containers, which containers may reside at one or more locations.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 4 is a table representing exemplary data resulting from use of an exemplary liquid nitrogen container monitoring system to monitor a liquid nitrogen tank of interest;

DETAILED DESCRIPTION OF THE EXEMPLARY EMBODIMENTS

Figure 1:
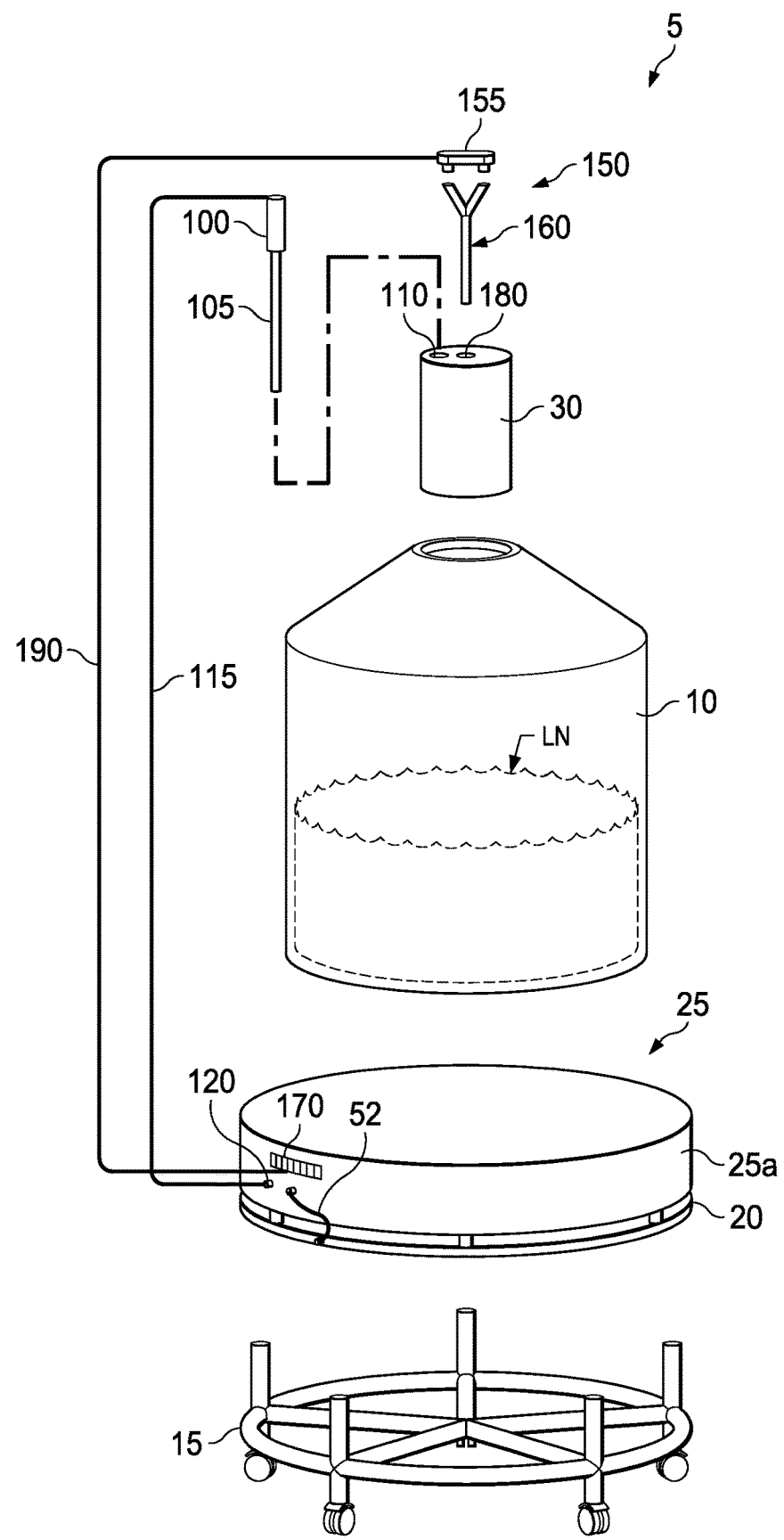
FIG. 1 represents one exemplary embodiment of a liquid nitrogen container monitoring system according to the general inventive concept.

One exemplary embodiment of a liquid nitrogen container monitoring system 5 is represented generally in FIG. 1. The system is operative to monitor the amount of liquid nitrogen LN present in a liquid nitrogen container in the form of a liquid nitrogen tank 10, such as a tank commonly referred to in the art as a dewar or cryogenic storage dewar. As shown, the exemplary system 5 includes an optional wheeled base 15, a weight sensor 20 in the form of a weighing scale, and a sensor base 25 having a housing 25a and, as described in more detail below, may enclose a power source(s) and various electronic components, and may also serve as a sensor connection point. The scale 20 and sensor base 25 may be separate components or the scale 20 may be a part of the sensor base 25. The exemplary system 5 is further shown to include an insulated lid 30 that is operative to close and seal the liquid nitrogen tank 10, as would be understood by one of skill in the art.

In this exemplary system embodiment, the scale 20 is configured to reside on the wheeled base 15, and the sensor base 25 is configured to reside atop the scale 20 so as to be interposed between the bottom of the liquid nitrogen tank 10 and the scale 20 during the tank monitoring operation. In embodiments where the wheeled base 15 is not used, it should be apparent that the scale 20 may rest directly on the floor or another surface that will support the system 5 and the liquid nitrogen tank 10. In either case, the weight of the liquid nitrogen tank 10 is transferred to the scale 20 via the interposed sensor base 25.

In still other embodiments, the electronic functionality of the sensor base 25 of this exemplary embodiment may be incorporated in another form. For example, the electronic functionality of the sensor base 25 of this exemplary embodiment may be incorporated into a device such as an intermediate connection-transmission device that can serve as a connection point for the sensors, to receive the sensor data, and to transmit the sensor data to a monitoring device 50. Such a device may be associated with the weight sensor 20 or may be an entirely separate component that may be conveniently placed or mounted elsewhere. In such an embodiment, the sensor base 25 may be omitted from its location between the weight sensor 20 and the liquid nitrogen tank 10, whereby the liquid nitrogen tank may rest directly on top of the scale.

In the exemplary system 5, the weight sensor is provided generally in the form of a floor-type weighing scale 10. However, the weight sensor used is not limited to such a weighing scale, and in other embodiments the weight sensor may be comprised of another type of scale, one or a collection of interconnected load cell devices, etc. It may also be possible to suspend a liquid nitrogen container from a weight sensor instead of placing a weight sensor beneath a liquid nitrogen container. The weight sensor may be configured or otherwise adapted to work with a given liquid nitrogen container, or a weight sensor may be provided that is usable with a range of different liquid nitrogen tank containers and configurations. In any case, the weight sensor selected is preferably sufficiently sensitive to detect even small changes in the weight of the liquid nitrogen container residing thereon.

Figure 2:
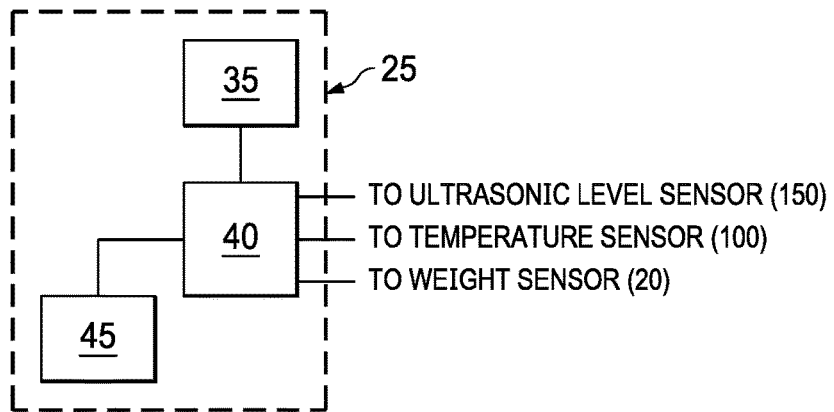
FIG. 2 is a schematic representation of the electronic componentry of a sensor base portion of the system of FIG. 1.

As mentioned generally above, a sensor base such as the sensor base 25, may house a power source(s) and communications components. Referring now to FIG. 2, it may be observed that in the case of the system 5, the exemplary sensor base 25 houses a battery 35, a controller (e.g., microprocessor) 40 that is in electrical communication with the battery, and a wireless transmitter 45 that is in electrical communication with the battery and the controller. The sensor base 25 may also include a connector such as a plug or cable that allows (along with any necessary electronics/circuitry) the controller 40 and transmitter 45 to be connected to and to operate primarily on AC power, with the battery 35 acting only as a backup power source.

The controller 40 of the sensor base 25 receives data signals from the weight sensor 20. While a wired connection 52 is shown between the sensor base 25 and the weight sensor 20 in the exemplary system 5, communications between the sensor base and the weight sensor may also occur wirelessly. In any case, received weight sensor data is passed from the controller 40 to the transmitter 45 for subsequent wireless transmission to a monitoring device 50, as described in more detail below.

While transmission of weight sensor data between the sensor base 25 (transmitter 45) and the monitoring device 50 occurs electronically in this exemplary system 5, it is to be understood that weight sensor data transmission via wired communication means may be utilized in other embodiments. While not limited to such an embodiment, weight sensor data transmission via wired communication means may be particularly applicable and cost effective in embodiments where the sensor base 35 and the monitoring device 50 are in close proximity to one another.

During a monitoring operation of the exemplary system, the controller 40 of the sensor base 25 may go through a repeating sleep-wake cycle to conserve battery power. In one such exemplary sleep-wake cycle, the controller 40 stays in sleep mode for five minutes, subsequently awakens to read the weight sensor signal and to cause the transmitter to transmit weight sensor data associated with the weight sensor signal, and then repeats the cycle by returning to sleep mode. Before re-entering the sleep mode, the controller 40 may also perform other functions such as, but not limited to, checking the power level of the battery 35.

A controller sleep-wake cycle may utilize different time intervals in other embodiments. In still other embodiments, such as but not limited to embodiments where the sensor base is normally connected to an AC power source and the battery is used primarily/only for backup purposes, the controller may remain awake instead of operating on a sleep-wake cycle and may also cause the transmitter to transmit weight sensor data on a more frequent or even on a substantially continuous basis.

Figure 3A:
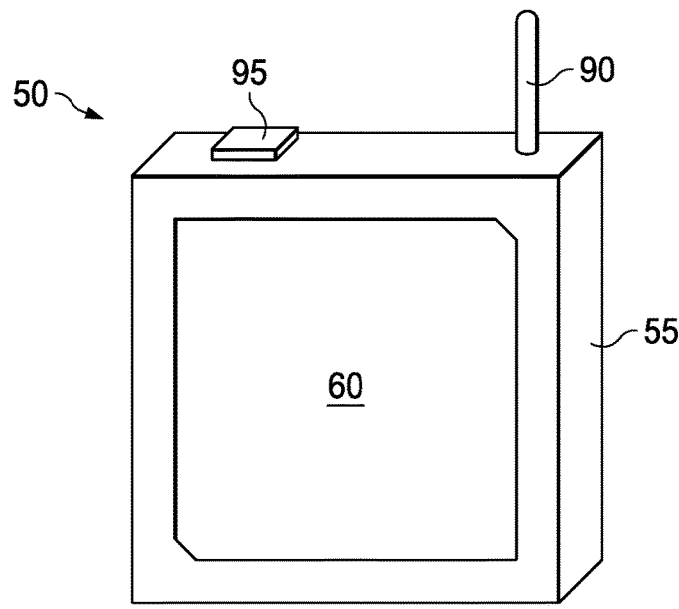
FIG. 3A illustrates an exemplary monitoring device for receiving sensor signals and analyzing said sensor signals to identify liquid nitrogen container leaks.

An exemplary monitoring device 50 is illustrated in FIG. 3A. Such a monitoring device may be of various different sizes and shapes. The monitoring device 50 may be a custom device that includes all desired functionality but whose specific appearance and/or construction may vary from application-to-application.

The monitoring device 50 may also be configured to communicate sensor data and/or messages or information resulting from analysis of sensor data, to a third party monitoring device. For example, and without limitation, the monitoring device 50 may be configured to communicate with a monitoring device 95 that is commercially available from Sensaphone® in Ashton, Pennsylvania, or with another monitoring third party monitoring device via a wired 95a or wireless (not shown) connection therebetween.

The exemplary monitoring device 50 of this system embodiment includes a housing 55 for enclosing various electronic components thereof. The monitoring device 50 also includes a visible display 60 that indicates—either continuously or when prompted—at least the current weight of the liquid nitrogen tank 10. As would be apparent to one of skill in the art, a multitude of other information may also be presented on the display screen 60.

The display screen 60 may be a touch screen and/or the monitoring device 50 may include one or more buttons, touch pads, joysticks or other input mechanisms that allow a user to interact with the monitoring device 50. In other words, the monitoring device 50 preferably includes a human-machine interface (HMI) that at least allows a user to enter basic input data into the monitoring device. Such a HMI 50 may be useful, for example, to identify the liquid nitrogen tank 10 to be monitored to the monitoring device 50 and/or to set other parameters that may be required in order for the monitoring device to properly analyze subsequent weight readings produced by the scale 10.

Depending on the given liquid nitrogen tank to be monitored and the information already present in or accessible by the monitoring device 50, identifying the liquid nitrogen tank may be as simple as entering a model or serial number. Alternatively, the brand, size and/or other data may be manually entered into the monitoring device 50 to identify a given liquid nitrogen tank. Still alternatively, a more advanced system may include an identification mechanism by which liquid nitrogen tanks and other containers may be recognized automatically. Such automatic recognition may be accomplished through the use of, for example, bar code or RFID scanning technologies, vision system technology (e.g., the reading of a color, symbol or shape code), or by any other technique that would be understood by one of skill in the art.

In lieu of or in addition to a user interface on the monitoring device itself, at least some embodiments may permit data input to be accomplished remotely, such as by connection to a remote computer.

Figure 3B:
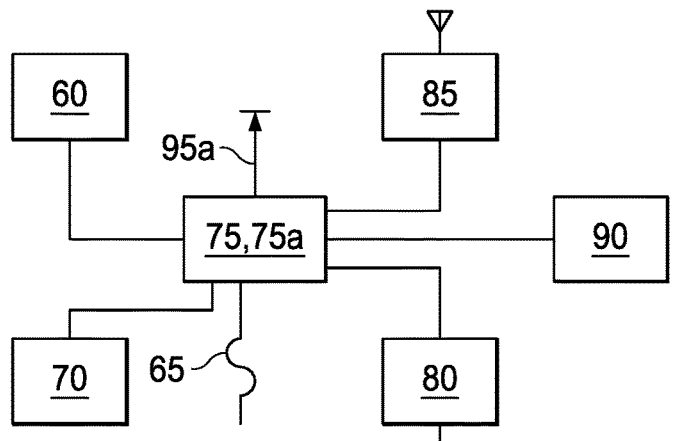
FIG. 3B is a schematic representation of the electronic componentry of the exemplary monitoring device of FIG. 3A.

The monitoring device 50 includes the ability to analyze weight data generated by the scale 20 and to use said weight data to detect any leaks in the liquid nitrogen tank 10. In this regard, it may be observed by reference to the schematic diagram of FIG. 3B that the monitoring device 50 includes a primary AC power source 65, a backup power source 70 (e.g., a battery or capacitor), and a controller (e.g., a single-board computer) 75 that is in electrical communication with both the primary power source 65 and the backup power source 70 and includes associated memory 75a.

The monitoring device 50 further includes a wireless receiver 80 for receiving weight data transmitted by the transmitter 45 of the sensor base 25, and a wireless transmitter 85 for transmitting alarm notifications and, optionally, other information to one or more identified personnel. An antenna 90 may be placed in communication with the wireless receiver 80 and the wireless transmitter 85 and used to facilitate the operation thereof. While the wireless receiver 80 and the wireless transmitter 85 are shown as separate components for purposes of illustration, it should be realized that the receiver 80 and transmitter 85 may be parts of a single wireless transceiver. Further, while a wireless communications means between the sensor base 25 and the monitoring device 50 is shown and described herein, it should be understood that wired communications between said components may be used in some embodiments, or wired communications may be used in addition to wireless communications such as in a redundant communications setup. A single monitoring device may communicate with and receive data from a plurality of different sensor bases. That is, a number of different liquid nitrogen containers may be monitored by a single monitoring device.

As described briefly above, weight data may be sent from the sensor base 25 to the monitoring device 50 at regular predetermined intervals, which may be adjustable. Conversely, weight data may be sent from the sensor base to the monitoring device 50 only when the sensor base is prompted for said data by the monitoring device.

The monitoring device 50 is further configured, such as through the controller 75 and cooperating programming in the form of software or otherwise, to analyze the weight data generated by the scale 20 and to determine if any change in the measured weight of the liquid nitrogen tank 10 is within or outside of a normal, expected, weight change value range. In order for the monitoring device 50 to be capable of performing such an analysis, the monitoring device must first be informed as to what constitutes a normal, expected, weight change for the liquid nitrogen tank 10 over a given period of time. This may be accomplished experimentally over time by repeatedly monitoring the weight change of a given tank known to have no leaks and filled for each experiment with the same amount of liquid nitrogen. By this process, an expected amount of weight change per unit time—which may or may not be linear in nature—may be determined and stored in a memory of the monitoring device 50, or otherwise made accessible to the monitoring device such as by storage in an external/remote database with which the monitoring device can communicate. Such information may be provided to the monitoring device in the form of a lookup table or in any other form that may be used by the monitoring device.

Alternatively, the expected amount of weight change per unit time for a given liquid nitrogen tank may already be known, such as through data available from the tank manufacturer. In such a case, said data may simply be entered into or made available to the monitoring device.

A detected weight change value outside of an expected weight change value range may indicate a leak in a monitored liquid nitrogen tank—with the differential between the measured value and the expected value being possibly indicative of leak severity. The programming of the monitoring device 50 may also be configured to identify trends and to predict possible failures (leaks) before they actually happen. For example, the system 5 may collect and analyze weight data for the monitored liquid nitrogen tank 10 over time. The system may use this data to establish, for example, a typical amount of liquid nitrogen weight loss for said tank 10 per a given period of time, and even for different periods of time after the tank has been filled in the case where weight loss may not be linear in nature. This established expected weight loss may also be used to identify failure trends. For example, a deviation from the established expected weight loss that is still within an acceptable weight loss range but continues to increase with each tank filling may be indicative of an impending leak. Based on the rate at which the increase in weight loss occurs over time and the alarm setpoint, the system 5 may predict when the tank 10 will fail (e.g., within some additional number of fillings or within some time period).

Monitoring liquid nitrogen tanks for leaks based on weight loss is an improvement over known techniques that rely only on internal tank temperature measurement. The data shown in FIG. 4 represents one example of how an exemplary weight-based system and method provides for better leak detection than a monitoring system based on internal tank temperature. In this example, a liquid nitrogen tank of interest was initially filled with liquid nitrogen on April 25 and, according to the exemplary weight-based monitoring system being used, weighed 100 lbs. at 10:20 AM. Approximately four hours later, at 2:30 PM, the tank weighed 98.5 lbs., and by 1:45 PM the following day (April 26), weighed 88.0 lbs. Based on experimental or known weight loss data relative to this particular tank and provided to the exemplary monitoring device, this weight loss over the elapsed time period is determined to be within the normal range in this example (but may not be with respect to another tank). During the same time period, the temperature probe of an also employed temperature-based monitoring system indicates an internal tank temperature of $-196°$ C., which is also considered to be normal. However, by 6:30 AM four days later (April 29), the exemplary weight-based monitoring system reports a tank weight of only 41.65 lbs., which reflects an empty tank resulting from a rate of liquid nitrogen loss that is well outside of the normal range and would certainly have triggered an alarm/alert on the exemplary weight-based monitoring system well before the tank became empty. In contrast, the temperature probe still indicates an internal tank temperature of $-177°$ C. because the probe resides in liquid nitrogen vapor that remains in the tank.

As illustrated by the above example and the data of FIG. 4, weight-based monitoring is clearly superior to temperature-based monitoring of liquid nitrogen tanks. While the exemplary weight-based monitoring system would alert a user to a potential catastrophic tank failure in this example, and with sufficient time to take action, the traditional temperature-based monitoring system failed to detect a problem until all of the liquid nitrogen had already escaped—a point at which it is far too late to save any specimens in the tank.

As described above, an exemplary liquid nitrogen container monitoring system may be configured to identify trends and to predict possible failures (leaks) before they actually happen. Such functionality is very useful with respect to evaluating long-term liquid nitrogen tank health. As also described above, liquid nitrogen tank performance degradation often occurs over a long period of time, with the degradation in performance typically manifesting as a very slow leak that results in an inability of the tank to maintain its previous vacuum capacity. Even though the leak may increase in severity over time, the overall degradation rate is sufficiently slow that it may never trigger an alarm until the leak becomes a significant leak.

The frequent weight reading and analysis functionality of an exemplary liquid nitrogen container monitoring system allows such slow leaks and resulting tank performance degradation to be detected even if no weight change value outside of an expected weight change value range is ever detected by the system. Particularly, an exemplary system can still detect and identify a long-term downward trend in the rate of tank weight loss even if the rate of weight loss is too insignificant to ever produce a weight change value outside of an expected weight change value range that results in a significant tank leak alarm.

When used for this purpose, weight data for a given monitored liquid nitrogen tank 10 collected over time may be analyzed to establish a typical amount of liquid nitrogen weight loss for said tank per a given period of time. The actual rate of weight loss of the monitored tank may then be compared to the established expected rate of weight loss to determine if the rate of weight loss is increasing, such as over the course of some predetermined number of tank refills, over some predetermined time period, etc.

In a most basic embodiment, a user can simply review the long-term weight reading data and, upon observing a downward trend in the rate of tank weight loss (i.e., an increasing rate of weight loss) over some period of time, determine that the tank at issue merits increased scrutiny or should be replaced to avoid a more serious leak. Alternatively, the system itself may automatically indicate a long-term degradation problem. For example, the system may be provided with another expected weight change value range that is indicative of a slow vacuum leak if exceeded, or the system may be programmed to interpret a continual downward trend in the rate of tank weight loss over some predetermined number of tank refills and/or some predetermined period of time to represent a tank degradation problem and to indicate the same to a user.

The aforementioned failure trend identification functionality described above with respect to predicting significant tank failures may also be applied to long-term tank degradation. For example, a deviation from the established expected weight loss that is still within an acceptable weight loss range but continues to increase with each tank filling may be indicative of increasing tank degradation that might eventually lead to a tank failure, and the system can predict when that failure might occur even if in the distant future.

In another embodiment, an exemplary liquid nitrogen container monitoring system such as the liquid nitrogen container monitoring system 5 described above, may be used to monitor and direct the filling of a liquid nitrogen tank instead of detecting and reporting leaks. Problematic underfilling or overfilling of liquid nitrogen tanks is mentioned generally above. To overcome these problems, the exemplary liquid nitrogen container monitoring system 5 may be used to monitor the weight of an empty (or otherwise less than full) liquid nitrogen tank during the filling process and to indicate to a user when an ideal fill level has been reached.

The ideal tank fill level is based on the weight of the tank. In order for the system 5 to operate in this manner, the weight of a given tank when filled to the ideal level must be known to the system. As in the case of system use for detecting significant tank failures, this may be accomplished experimentally by weighing a given tank when filled to an ideal level and storing the weight information in a memory of the monitoring device 50, or in a location that is otherwise accessible to the monitoring device, such as storage in an external/remote database with which the monitoring device can communicate. Such information may be provided to the monitoring device in the form of a lookup table or in any other form that may be used by the monitoring device. Alternatively, the weight of a given tank when filled to an ideal level with liquid nitrogen may already be known, such as through data available from the tank manufacturer, in which case said data may simply be entered into or made available to the monitoring device. Tank identification by or to the system may occur by any of the techniques described above.

Upon a given tank reaching an ideal liquid nitrogen fill level during a filling process, an indication of the same may be provided to a user (e.g., the tank filler), such as via the visible display 60 of the monitoring device 50. An audible indicator may also be provided, or may be provided in lieu of a visual indicator. The progress of the filling process may also be indicated to a user, such as by a visual and/or audible indicator that changes as the tank fill level approaches ideal.

The system may be configured such that the frequency at which tank weight readings are taken and compared to a target tank weight increases as the weight of the tank approaches the target tank weight.

Referring again to FIGS. 1-2, it may be observed that the exemplary system 5 also includes optional sensors. Particularly, this exemplary system 5 includes a temperature sensor 100 that is configured to measure tank temperature and a liquid nitrogen level detector that, in this exemplary system, is provided in the form an ultrasonic sensor 150 that is configured to measure the level of the liquid nitrogen LN present in the liquid nitrogen tank 10.

The temperature sensor 100 is shown in this exemplary system embodiment to comprise a probe having a temperature measuring section 105 that extends through a sealed orifice 110 in the liquid nitrogen tank lid 30 so as to reside in a space above the surface of the liquid nitrogen LN and to measure the internal tank temperature. Alternatively, it may be possible for the measuring section 105 of the temperature sensor 100 to extend through another opening in the liquid nitrogen tank 10 if a sufficient seal can be provided. Other types of temperature sensors may be used in other embodiments, whether to measure internal tank temperature or otherwise. For example, and without limitation, an appropriate temperature sensor may be affixed to the exterior of the liquid nitrogen tank 10 so as to measure the external tank temperature. The use of various types of temperature sensors for measuring liquid nitrogen tank temperature would be well understood by one of skill in the art.

The temperature sensor 100 is placed in wired or wireless communication with the sensor base 25. In this exemplary system 5, the temperature sensor 100 communicates with the sensor base 25 via a wired connection 115 between the temperature sensor 100 and a connection port 120 on the sensor base 25. The connection port 120 places the temperature sensor 100 in communication with the sensor base controller 40 (see FIG. 2). Alternatively, the temperature sensor may be a wireless sensor and the sensor base 25 may be configured to receive the wireless tank temperature data signals from the temperature sensor and to pass the data to the controller 40.

In any case, the sensor base controller 40 will receive signals containing tank temperature data from the temperature sensor used, whereafter the tank temperature data may be transmitted by the sensor base transmitter 45 to the monitoring device 50 along with, or in addition to, weight data generated by the scale 20. While the deficiencies associated with using a temperature sensor as the sole means of detecting a liquid nitrogen container leak have been described above, it has been found that liquid nitrogen tank temperature monitoring can nonetheless be useful as a redundant and complimentary leak detection method when used in conjunction with a weight-based liquid nitrogen container monitoring system 5.

Figure 5B:
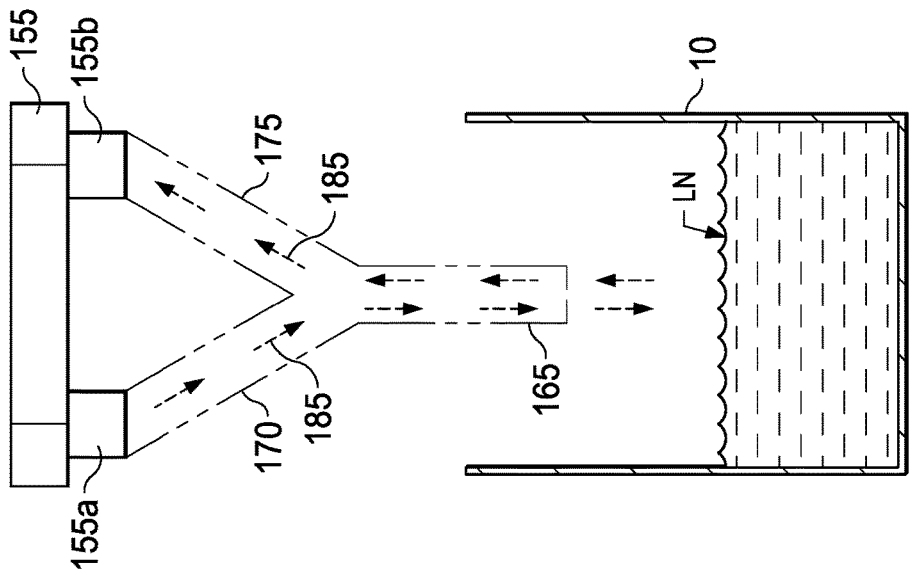
FIG. 5B indicates the manner of operation of the ultrasonic liquid nitrogen level sensor of FIG. 5A.
Figure 5A:
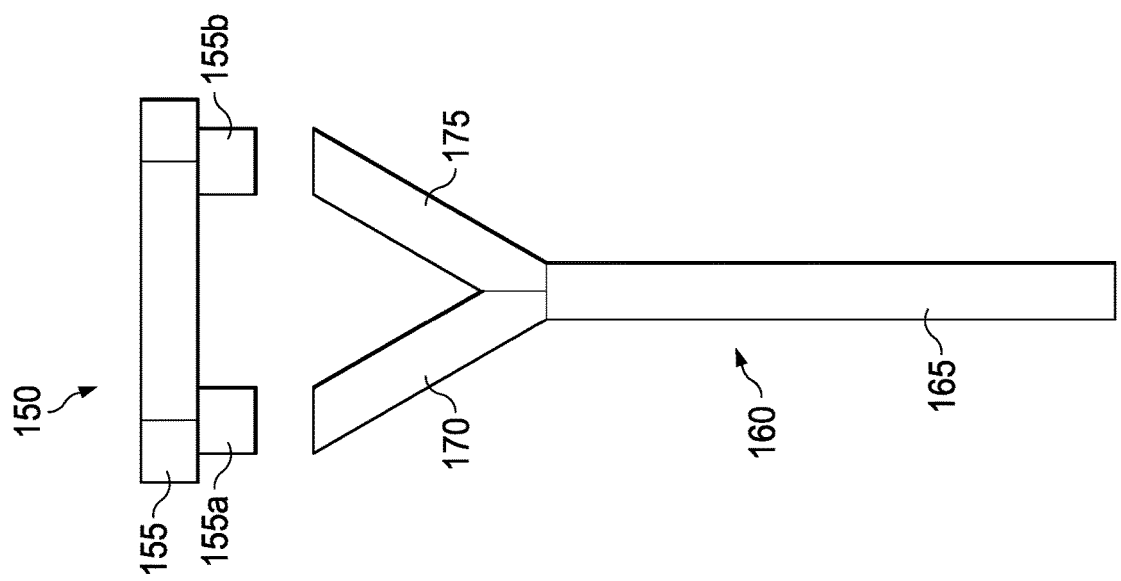
FIG. 5A illustrates an ultrasonic liquid nitrogen level sensor that is useable with an exemplary embodiment of a liquid nitrogen container monitoring system.

As may be observed in FIG. 1, and more clearly in FIG. 5A, the exemplary ultrasonic sensor 150 used in the exemplary system embodiment comprises an emitter-receiver device 155 having an ultrasonic emitter 155a and an ultrasonic receiver 155b, and a waveguide 160 that directs ultrasonic signals from and to the emitter/receiver device 155. In this exemplary ultrasonic sensor 150, the waveguide 160 is a substantially Y-shaped tube. An elongate central leg 165 of the waveguide 160 passes through a sealed orifice 180 in the tank lid 30 such that at least a distal end of the central leg 165 communicates with the interior of the liquid nitrogen tank 10 when the lid 30 is installed thereto. A pair of branch legs 170, 175 extend at diverging angles from a proximal end the of the central leg 165 of the waveguide 160. One of the branch legs 170 is associated with the emitter 155a of the emitter-receiver device 150, while the other of the branch legs 175 is associated with the receiver 155b of the emitter-receiver device.

Other types of ultrasonic sensors may be used in other embodiments. For example, and without limitation, while the exemplary ultrasonic sensor 150 shown ad described herein includes a separate emitter and receiver, a single ultrasonic transducer that functions as both an emitter and receiver may be used instead. In conjunction therewith, an ultrasonic waveguide having a construction other than the Y-shape of the exemplary guide tube 160 of the exemplary ultrasonic sensor 150 may be utilized. Further still, it is contemplated that a liquid nitrogen level detector may possibly be constructed using a sensor other than an ultrasonic sensor, such as for example, a wirelessly-transmitting float, an optical sensor, a conductivity or resistivity sensor, etc.

Operation of the exemplary ultrasonic sensor 150 is represented in FIG. 5B. As indicated therein, the ultrasonic emitter 155a of the ultrasonic emitter-receiver device 150 is caused to emit an ultrasonic signal 185. The ultrasonic signal 185 travels through the first branch leg 170 and then through the central leg 165 of the waveguide 160, whereby the signal is directed against the liquid nitrogen LN in the liquid nitrogen tank 10. The ultrasonic signal is reflected by the surface of the liquid nitrogen LN back through the central leg 165 and subsequently the second branch leg 175 of the waveguide 160, where it is received by the receiver 155b of the ultrasonic emitter-receiver device 150.

The ultrasonic sensor 150 is placed in wired or wireless communication with the sensor base 25. In this exemplary system 5, the ultrasonic sensor 150 communicates with the sensor base 25 via a wired connection 190 between the ultrasonic sensor 150 and a connection port 170 on the sensor base 25. The connection port 170 places the ultrasonic sensor 150 in communication with the sensor base controller 40 (see FIG. 2). Alternatively, the ultrasonic sensor 150 may be a wireless sensor and the sensor base 25 may be configured to receive the wireless liquid nitrogen level data signals from the ultrasonic sensor and to pass the data to the controller 40.

In any case, the sensor base controller 40 will receive signals containing liquid nitrogen distance (level) data from the ultrasonic sensor used, whereafter the liquid nitrogen level data may be transmitted by the sensor base transmitter 45 to the monitoring device 50 along with, or in addition to, weight data generated by the scale 20. As would be understood by one of skill in the art, the time between emission of the ultrasonic signal 185 by the emitter 155*a* and reception of the reflected ultrasonic signal 185 by the receiver 155*b*, is useable by the monitoring device 50 to determine the distance of the surface of the liquid nitrogen LN from the ultrasonic emitter-receiver device 150. Thus, if an initial distance to the surface of the liquid nitrogen LN is determined after filling of the liquid nitrogen tank 10, a sufficient change in a subsequently measured distance may be indicative of a leak. For example, a detected distance change value that is outside of an expected distance change value range may indicate a leak in the liquid nitrogen tank 10—with the differential between the measured value and the expected value being possibly indicative of leak severity. The system 5 may also be programmed to recognize a completely empty tank, such as by using the monitoring device 50 and data from the ultrasonic sensor 150 to determine the distance to the bottom of the liquid nitrogen tank 10 while the tank is in an empty state.

As in the case of monitoring the weight of the liquid nitrogen tank, the programming of the monitoring device 50 may also be configured to use measurement data from the ultrasonic sensor 150 to identify trends and to predict possible failures (leaks) before they actually happen. For example, the system 5 may collect and analyze liquid nitrogen level data for the monitored liquid nitrogen tank 10 over time and may use this data to identify failure trends and to predict failures in a manner similar to that described above relative to weight-based monitoring.

When a system such as the exemplary system 5, employs multiple sensors, it is possible to assign equal weight to the readings produced by each of the sensors, or to assign a sensor hierarchy. In the case of the exemplary system 5, where an optional temperature sensor 100 and ultrasonic liquid nitrogen level sensor 150 are present along with the weight sensor 20, assigning equal weight to each of the sensor readings may result in an alarm indication any time one or a combination of the sensors detects an abnormal tank condition. For example, an alarm may be initiated if: readings from the weight sensor 20 indicate that the weight of the liquid nitrogen tank 10 is decreasing too rapidly or has reached some low or minimum weight threshold; readings from the ultrasonic liquid nitrogen level sensor 150 indicate that the surface level of the liquid nitrogen LN in the liquid nitrogen tank 10 is dropping too rapidly or has reached some predetermined low or minimum level (e.g., some predetermined distance from the ultrasonic sensor 150 or the bottom of the tank); and/or readings from the temperature sensor 100 indicate that the temperature within the liquid nitrogen tank 10 is increasing too rapidly or has reached some threshold temperature.

According to such a methodology, an alarm may also be initiated any time there is disagreement between sensor readings. For example, if readings from the weight sensor 20 indicate a normal liquid nitrogen tank condition but readings from the ultrasonic sensor 150 indicate an abnormal liquid nitrogen tank condition (i.e., a leak), an alarm may be triggered. In such an embodiment, it is possible to assign a range of magnitude of sensor disagreement or a threshold level of sensor disagreement that must be exceeded in order for an alarm to be initiated.

In contrast to the aforementioned methodology where readings from all of the present sensors are given equal weight, it is also possible to create a sensor hierarchy when multiple sensors are utilized. For example, in the system 5, the weight sensor 20 may be designated the primary sensor, with readings from the temperature sensor 100 and the ultrasonic sensor 150 being used only in a comparative/confirmatory manner. In such a case, the condition of the liquid nitrogen tank 10 might be considered to be that indicated solely by weight sensor readings, unless a discrepancy between the weight sensor readings and readings from one or both of the temperature sensor 100 and the ultrasonic sensor 150 exceeds some predetermined threshold. Other sensor hierarchy methodologies are also possible.

Another aspect of exemplary embodiments of the invention is the automatic alerting of local and/or remotely located interested parties (e.g., operators, supervisors, maintenance personnel, etc.) of a leak or a predicted leak. In the case of a predicted leak, such an alert may be sent, for example, when a tank is within some number of fillings from occurrence of the predicted leak, within some time period of the predicted leak, or even as soon as a predicted leak is identified. In the case of an actual leak, such an alert should be sent as soon as the leak is detected.

An alert may be in the form of an audible and/or visual alarm at the local level, such that onsite personnel may be notified and respond. The system may also send out remote alerts by wired or wireless communication methods in the form of, without limitation, voice, text, or email messages. The interested parties to be contacted with remote alerts may be determined (set) in a number of ways, such as by direct or indirect registration. For example, the system may be provided with a cellular phone number list and all parties whose number appears on the list will be notified of each alarm. Alarms may also be generally reported to a call center, which could thereafter take responsivity for notifying appropriate personnel. Under any alarm reporting methodology, a personnel alerting hierarchy may also be established, such that not all possible personnel will necessarily receive notification of every type of alarm. Onsite personnel may be alerted by local alarms and may also be alerted by remote alert messages. In addition to alarm notifications that are indicative of problems or possible problems, a system may also send periodic confirmations of normal tank conditions (i.e., OK messages) when no tank leaks or other abnormalities are detected over some selected period of time.

A given system may include a remote server and possibly remote database components. The remote server may permit remote control of the system, as well as data logging and other remote functions. The use of a cloud-based data management system is also possible. Appropriate web and/or other user interfaces may be provided in such embodiments. Remote databases may store expected weight loss data for known liquid nitrogen tanks and/or other useful data such as expected tank temperature change data or expected liquid nitrogen level change data that may be accessed and used by a given system. In some embodiments, at least certain system functions may be remotely accessible by computer or other electronic means.

Furthermore, while a local system is described herein as performing the monitoring and analysis functions, it should be realized that all monitoring, analysis, and even alerting, may occur remotely. For example, one or multiple weighing devices weighing a plurality of separate liquid nitrogen tanks may be connected to a remote monitoring system, and may report to the remote monitoring system, which would then be responsible for issuing at least the remote alerts.

The clear majority of IVF programs (as well as universities, research facilities, etc.) currently monitor for leaks based on measured tank temperature. A liquid nitrogen tank that is currently temperature monitored can very easily be changed over to weight-based monitoring using an exemplary system and method described herein. The adaptable nature of the monitoring device allows an exemplary system to be used with any liquid nitrogen tank type, size or construction, as weighing device capacity may be scaled according to tank size and the monitoring device programming may be configured relative to any liquid nitrogen tank and its normal/expected weight loss rate. Additionally, if desired, an exemplary system and method may be used as the primary means of liquid nitrogen tank leak detection with an existing or additional tank temperature-based monitoring system and/or ultrasonic-based liquid nitrogen level monitoring used as a backup.

While certain embodiments of the inventive concept are described in detail above, the scope of the inventive concept is not considered limited by such disclosure, and modifications are possible without departing from the spirit of the inventive concept as evidenced by the following claims:

What is claimed is:

1. A container content loss monitoring system, said system comprising:
   a weight sensor having a housing with a top surface, the weight sensor configured to measure the weight of a container residing directly or indirectly on the top surface or contents thereof;
   a monitoring device including a controller and a transmitter, the controller communicatively connected to the weight sensor and configured to periodically receive container weight data therefrom; and
   programming in or associated with the monitoring device controller that causes the controller to:
      analyze container weight reading data received from the weight sensor to determine a weight and a weight change rate for the container or contents thereof,
      determine if the weight falls below predetermined threshold;
      determine if the weight change rate reaches or exceeds a predetermined value; and
      generate an alert if the weight is determined to fall below the predetermined threshold, if the weight change rate is determined to have reached or exceeded the predetermined value, and if both the weight is determined to fall below the predetermined threshold and the weight change rate is determined to have reached or exceeded the predetermined value.

2. The system of claim 1, further comprising a temperature sensor located and configured to determine the temperature of the container or the contents of the container, the temperature sensor communicatively connected to the controller of the monitoring device.

3. The system of claim 2, wherein the temperature sensor is located and configured to determine the temperature of an external surface of the container.

4. The system of claim 1, wherein the monitoring device further comprises a receiver.

5. The system of claim 4, further comprising:
   a remote server that is located away from the monitoring device but is communicatively connected thereto;
   wherein the receiver of the monitoring device is configured to receive signals from the remote server and the transmitter of the monitoring device is configured to send signals to the remote server.

6. The system of claim 5, wherein the remote server is part of a cloud-based data management system that is communicatively connected to the monitoring device.

7. The system of claim 4, wherein the receiver and the transmitter of the monitoring device are parts of a single transceiver.

8. The system of claim 1, wherein the container is a liquid nitrogen tank, and the top surface is configured to receive, and support, the liquid nitrogen tank.

9. A container content loss monitoring system, comprising:
   a weight sensor having a housing with a top surface, the weight sensor configured to determine the weight of a container residing directly or indirectly on the top surface or the contents thereof;
   a temperature sensor located and configured to determine the temperature of the container or the contents thereof;
   a monitoring device including a controller, a receiver, and a transmitter, the controller communicatively connected to the weight sensor and the temperature sensor and configured to periodically receive weight reading data from the weight sensor and temperature reading data from the temperature sensor; and
   programming in or associated with the controller that causes the controller to:
      analyze container weight reading data received from the weight sensor to determine a weight and a weight change rate for the container or the contents thereof, determine if the weight falls below a predetermined threshold, determine if the weight change rate has reached or exceeds a predetermined value, and generate an alert if the weight is determined to have fallen below the predetermined threshold, if the weight change rate is determined to have reached or exceeded the predetermined value and if both the weight is determined to have fallen below the predetermined threshold and the weight change rate is determined to have reached or exceeded the predetermined value; and,
      analyze temperature reading data received from the temperature sensor to determine a temperature and a temperature change rate for the container or the contents of the container, and generate an alert if the temperature is determined to have reached or exceeded a predetermined temperature threshold value, if the temperature change rate is determined to have reached or exceeded a predetermined temperature change rate threshold value, and if both the temperature is determined to have reached or exceeded a predetermined temperature threshold value and the temperature change rate is determined to have reached or exceeded a predetermined temperature change rate threshold value.

10. The system of claim 9, wherein the temperature sensor is located and configured to determine the temperature of an external surface of the container, and wherein the tank is a liquid nitrogen tank, and wherein the top surface is configured to support the liquid nitrogen tank.

11. The system of claim 9, further comprising:
   a remote server that is located away from the monitoring device but is communicatively connected thereto;
   wherein the receiver of the monitoring device is configured to receive signals from the remote server and the transmitter of the monitoring device is configured to send signals to the remote server.

12. The system of claim 11, wherein the remote server is part of a cloud-based data management system that is communicatively connected to the monitoring device.

13. The system of claim 9, wherein the receiver and the transmitter of the monitoring device are parts of a single transceiver.

14. A container content loss monitoring system, comprising:
- a weight sensor having a housing with a top surface, the weight sensor configured to determine the weight of a container residing directly or indirectly on the top surface;
- a temperature sensor located and configured to determine the temperature of an external surface of the container;
- a monitoring device including a controller, a receiver, and a transmitter, the controller communicatively connected to the weight sensor and the temperature sensor and configured to periodically receive weight reading data from the weight sensor and temperature reading data from the temperature sensor;
- a cloud-based remote server located away from the monitoring device but communicatively connected thereto for the exchange of signals with the receiver and the transmitter of the monitoring device;
- programming in or associated with the controller that causes the controller to:
  - analyze container weight reading data received from the weight sensor to determine a weight and a weight change rate for the container, determine if the weight is has reached a low or minimum weight threshold value, determine if the weight change rate has reached a weight change rate threshold value, and generate an alert where one and where both such conditions are determined to be present; and,
  - analyze temperature reading data received from the temperature sensor to determine a temperature and a temperature change rate for the container, determine if the temperature has reached a predetermined temperature threshold value, determine if the temperature change rate has reached a temperature change rate threshold value, and generate an alert where one and where both such conditions are determined to be present.

15. The system of claim 14, wherein the receiver and the transmitter of the monitoring device are parts of a single transceiver.

16. The system of claim 14 wherein the container is a liquid nitrogen tank and the top surface is configured to receive and support the liquid nitrogen tank.

17. A method of monitoring a container for content loss, comprising:
- placing a container to be monitored on a weight sensor, the weight sensor having a housing with a top weighing surface and configured to determine the weight of the container;
- using a temperature sensor to determine the temperature of an external surface of the container;
- providing a monitoring device that includes a controller, a receiver, and a transmitter, and communicatively connecting the controller to the weight sensor and the temperature sensor;
- periodically transmitting weight reading data from the weight sensor and temperature reading data from the temperature sensor to the monitoring device;
- analyzing, with the monitoring device, container weight reading data received from the weight sensor to determine a measured weight and a measured weight change rate;
- analyzing, with the monitoring device, temperature reading data received from the temperature sensor to determine a measured temperature and a measured temperature change rate;
- determine, by the monitoring device, that the measured weight has reached a low or minimum weight threshold value in at least one instance, and in said at least one instance, generate an alert;
- determine, by the monitoring device, that the measured weight change rate has reached a measured weight change rate threshold value in at least one other instance, and in said at least one other instance, generate an alert;
- determine, by the monitoring device, that the measured weight has reached the low or minimum weight threshold value and that the measured weight change rate has reached the measured weight change rate threshold value in at least other instance, and in said at least one other instance, generate an alert;
- determine, by the monitoring device, that the measured temperature has reached a predetermined temperature threshold value in at least one other instance, and in said at least one other instance, generate an alert;
- determine, by the monitoring device, that the measured temperature change rate has reached a predetermined temperature change rate threshold value in at least one other instance, and in said at least one other instance, generate an alert; and
- determine, by the monitoring device, that the measured temperature has reached the predetermined temperature threshold value and that the measured temperature change rate has reached the predetermined temperature change rate threshold value in at least one other instance, and in said at least one other instance, generate an alert.

18. The method of claim 17, further comprising communicatively connecting the receiver and the transmitter of the monitoring device to a cloud-based remote server located away from the monitoring device and exchanging signals between the monitoring device and the cloud-based remote server.

19. The method of claim 17, wherein the container is a liquid nitrogen tank, and the top surface is configured to receive and support the liquid nitrogen tank.

20. The method of claim 19, wherein the liquid nitrogen tank contains cryogenically stored in vitro fertilization specimens.

21. The system of claim 8, further comprising:
a wheeled base for the weight sensor.

22. The system of claim 21, wherein:
the wheeled base is detached from the weight sensor, which rests on the wheeled base.

* * * * *